United States Patent
Iwai et al.

(10) Patent No.: US 6,661,484 B1
(45) Date of Patent: Dec. 9, 2003

(54) RETARDATION MATCHING USING THE LIQUID CRYSTAL TWIST ANGLE FOR DIFFERENT COLOR DOTS WITHIN A PIXEL OF A REFLECTIVE COLOR LCD

(75) Inventors: Yoshio Iwai, Ishikawa (JP); Hisanori Yamaguchi, Ishikawa (JP); Tomoaki Sekime, Ishikawa (JP); Yoshihiro Sakurai, Ishikawa (JP); Tetsu Ogawa, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/547,612

(22) Filed: Apr. 12, 2000

(30) Foreign Application Priority Data

Apr. 12, 1999 (JP) ............................. 11-103422

(51) Int. Cl.$^7$ ............................. G02F 1/1335
(52) U.S. Cl. ................... 349/107; 349/113; 349/117; 349/181
(58) Field of Search ................ 349/113, 180, 349/181, 117, 107

(56) References Cited

U.S. PATENT DOCUMENTS 5,386,306 A * 1/1995 Gunjima et al. ............ 349/89
5,499,126 A * 3/1996 Abileah et al. ............. 349/106
5,798,809 A * 8/1998 Nakamura et al. .......... 349/119
5,995,180 A * 11/1999 Moriwaki et al. .......... 349/116
6,147,736 A * 11/2000 Hsieh et al. ................ 349/117

FOREIGN PATENT DOCUMENTS

| JP | 6-347777 | 12/1994 |
| JP | 8-220527 | 8/1996 |
| JP | 11-38397 | 2/1999 |

OTHER PUBLICATIONS

Chen et al, "Chromatic parameter space representation of LCD operating modes", IDRC '97, Sep. 1997.*

* cited by examiner

Primary Examiner—Kenneth Parker
(74) Attorney, Agent, or Firm—RatnerPrestia

(57) ABSTRACT

Deviation in phase difference of the light passing each of the red, green, and blue dots, i.e., $2\pi^*(\alpha^*d_R^*\Delta n_R + Re_R)/\lambda_R$, $2\pi^*(\alpha^*d_G^*\Delta n_G + Re_G)/\lambda_G$, and $2\pi^*(\alpha^*d_B^*\Delta n_B + Re_B)/\lambda_B$, are matched when thickness of a liquid crystal layer 7 at red, green, and blue dots are $d_R$, $d_G$, and $d_B$; wavelength of a visible light passing each dot is $\lambda_R$, $\lambda_R$, and $\lambda_B$; refractive index anisotropy of the liquid crystal layer 7 in the visible light wavelengths $\lambda_R$, $\lambda_R$, and $\lambda_B$ is $\Delta n_R$, $\Delta n_G$, and $\Delta n_B$; and retardations of a retardation plate are $Re_R$, $Re_G$, and $Re_B$. This enables the achievement of a reflective color LCD with high achromatic color during white display and high contrast display.

16 Claims, 9 Drawing Sheets

RETARDATION MATCHING USING THE LIQUID CRYSTAL TWIST ANGLE FOR DIFFERENT COLOR DOTS WITHIN A PIXEL OF A REFLECTIVE COLOR LCD

FIELD OF THE INVENTION

The present invention relates to the field of reflective color liquid crystal display devices.

BACKGROUND OF THE INVENTION

A reflective liquid crystal display device (reflective LCD) employs a liquid crystal panel to modulate ambient light entering from the front panel surface and to reflect it on a reflector provided on the rear face of the panel for display. The reflective LCD thus eliminates the need of a backlight which is necessary for a transmissive liquid crystal display device (transmissive LCD). This enables the reduction of power consumption, making the reflective LCD suitable for personal digital assistants and other mobile equipment.

However, since the reflective LCD displays images by reflecting ambient light, there is no function for adjusting the incident light level. Accordingly, if the luminance of ambient light is weak, such as when the equipment is used indoors or at night, the display screen becomes extremely dark due to low ambient light, with the consequent disadvantage of degraded viewability. The reflective LCD thus needs a high degree of reflectance to efficiently reflect the entering ambient light.

One approach to increase the reflectance includes the prevention of optical transmittance loss in the liquid crystal cells and optical members, combined with the increase of reflectance by the use of a reflector. By focusing on an optical transmission loss in a polarizer, methods of reducing optical transmission loss in the liquid crystal cells and optical members include the guest-host display system (Japanese Laid-open Patent No. H7-146469) which eliminates the use of a polarizer, and the single-polarizer system (Japanese Laid-open Patent No. H7–84252) that uses only one polarizer.

A method of increasing the reflectance of the reflector include a system for forming a reflective electrode (Japanese Laid-open Patent No. H8101384), which involves disposing the reflector, conventionally provided outside the liquid crystal cell, inside the liquid crystal cell, and to use aluminum, which has greater reflectance and lower electric resistance, as the material for the reflector to create a combined reflector and electrode. Another method is a system using a liquid crystal cell, a retardation plate, and a polarizer, with a light scattering function effected by concavity and convexity on the reflective electrode surface (Japanese Laid-open Patent No. H6-167708).

For example, in the reflective LCD shown in FIG. 9, a liquid crystal layer 7 is interposed between a glass substrate 1 on which a reflective electrode 2 is deposited, and an opposing glass substrate 6 on which red, green, and blue color filters 3a, 3b, and 3c, and a transparent electrode 5 are formed. A retardation plate 9 and polarizer 10 are disposed on the outer face of the glass substrate 6. A light-blocking layer 4 is disposed at the gap between the color filter layers to prevent light leakage. This type of reflective LCD employs both the single polarizer system using one polarizer and the system of providing the reflective electrode 2 having concavity and convexity inside the liquid crystal cell. The scattering performance is added to the reflective electrode with the aim of improving viewability by increasing the diffuse reflection. The incident light passes through the polarizer 10, and becomes linearly polarized light. This light is modulated by the retardation plate 9 and the liquid crystal layer 7, reflected on the surface of the reflective electrode 2, and then reaches the polarizer 10 after passing back through the liquid crystal layer 7 and retardation plate 9.

For displaying white (bright) and black (dark) colors in the reflective LCD using the single polarizer system, the light reflected on the reflective electrode face requires to be circularly polarized light over the entire visible light range in the case of black (dark) display, and linearly polarized light in the case of white (bright) display. In order to satisfy these conditions, the phase difference between the ordinary light and extraordinary light when the light passes in both ways to and from the retardation plate and liquid crystal in the visible range may need to satisfy the following formula in the case of white display:

$$2\pi*(RL+RF)/\lambda=\pi*m;$$

in which
RL: Retardation of the liquid crystal layer,
$\lambda$: Wavelength of the light,
RF: Retardation of the retardation plate, and
m: Natural number.

For black display, the phase difference may need to satisfy the following formula:

$$2\pi*(RL+RF)/\lambda=\pi*(m-\tfrac{1}{2}).$$

Here, $2\pi/\lambda$ times of retardation is the phase difference.

If the liquid crystal layer has a homogeneous orientation, the retardation RL of the liquid crystal layer may be expressed using Formula $\Delta n*d$, where $\Delta n$ is the refractive index anisotropy of liquid crystal, and d is the thickness of the liquid crystal layer.

However, in the above reflective LCD, the light passing each dot of red, green, and blue configuring pixels has a different optical wavelength, and thus the above formula may not be satisfied over the entire visible range. For example, if $\Delta n$, d, and RF are determined to satisfy the formula for green light, which has the highest visibility (around 550 nm), the same formula is not satisfied in other wavelength ranges for blue, which has a shorter wavelength (around 450 nm) and red, which has a longer wavelength (around 650 nm). In addition, since $\Delta n$ and RF are to some degree dependent on wavelength, the above formula is even more difficult to satisfy. Therefore, the light is insufficiently blocked in the black display, causing loss of contrast. Or, coloring (in particular, yellowing) due to degraded light modulation rate in the blue and red dots in the liquid crystal layer in white and halftone displays may occur.

The present invention aims to offer a reflective color LCD which prevents low contrast and coloring.

SUMMARY OF THE INVENTION

The reflective color LCD of the present invention includes a first substrate; a second substrate; a liquid crystal layer interposed between the first and second substrates; a reflective layer formed on an inner face of the first substrate, a color filter layer formed on an inner face of one of the first and second substrates, the color filter corresponding to each of red, green, and blue dots; a polarizer disposed on an outer face of the second substrate; and one of (1) a retardation plate disposed on the outer face of the second substrate, (2) an retardation layer formed on the inner face of the second substrate, and (3) a retardation layer formed on the inner face of the first substrate; wherein the reflective color liquid crystal display device is configured to satisfy Formulae 3 and 4:

$$0.9 \leq ((\alpha^* d_R^* \Delta n_R + Re_R)/\lambda_R)/((\alpha^* d_G^* \Delta n_G + Re_G)/\lambda_G) \leq 1.1 \quad (3); \text{ and}$$

$$0.9 \leq ((\alpha^* d_B^* \Delta n_B + Re_B)/\lambda_B)/((\alpha^* d_G^* \Delta n_G + Re_G)/\lambda_G) \leq 1.1 \quad (4); \text{ and}$$

in which, $d_R$, $d_G$, and $d_B$: Thickness of the liquid crystal layer at each of the red, green, and blue dots configuring a pixel; $\lambda_R$, $\lambda_G$, and $\lambda_B$: Wavelength of visible light passing each dot; $\Delta n_R$, $\Delta n_G$, and $\Delta n_B$: Refractive index anisotropy of the liquid crystal layer when the wavelengths of visible light are $\lambda_R$, $\lambda_G$, and $\lambda_B$; $Re_R$, $Re_G$, and $Re_B$: Retardation of one of the retardation plate and the retardation layer; and $\alpha$: coefficient dependent on a twisting angle of liquid crystal molecules in the liquid crystal layer, the coefficient being $\alpha=1$ when the twisting angle is 0 and $\alpha=0.69$ when the twisting angle is 45°.

Accordingly, the color reflective LCD of the single polarizer system prevents low contrast and reduces coloring in white and halftone displays by specifying phase difference of the light passing each of red, green, and blue dots to a predetermined range.

DESCRIPTION OF THE PREFERRED EMBODIMENT

Exemplary embodiments of a reflective liquid crystal display device of present the invention are described below.

First Exemplary Embodiments

Figure 1:
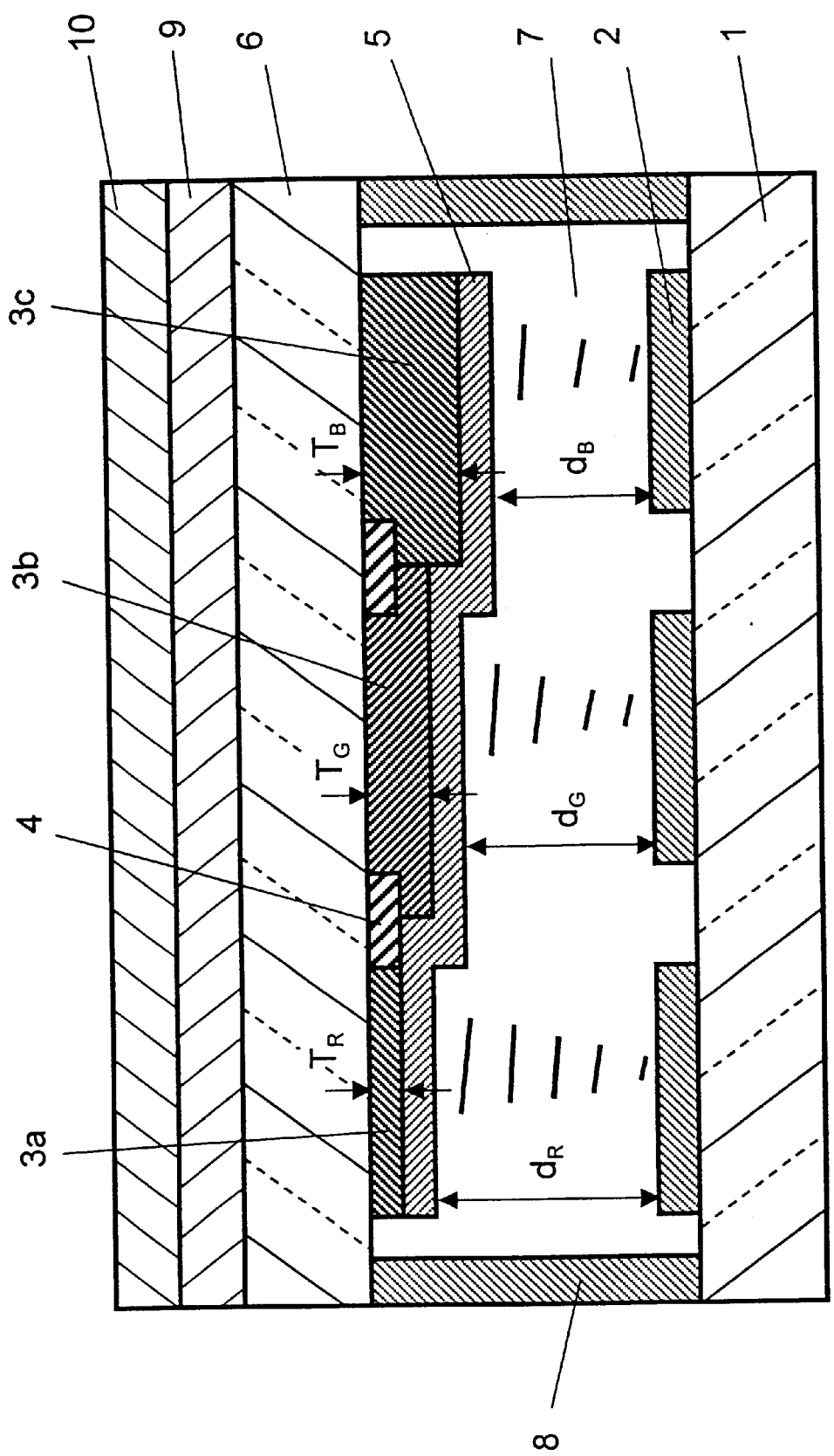
FIG. 1 is a sectional view of a reflective color liquid crystal display device in accordance with a first exemplary embodiment of the present invention.

A reflective liquid crystal display device (LCD) in a first exemplary embodiment of the present invention is described below with reference to FIG. 1. An aluminum reflective electrode 2 is deposited on one side of a glass substrate 1. A light-blocking layer 4, color filter layers 3a, 3b, and 3c for red, green, and blue, and transparent electrode 5 are sequentially deposited on the other glass substrate 6 opposing to the glass substrate 1. A liquid crystal layer 7 is interposed between the glass substrate 1 and glass substrate 6 by a sealing material 8. A retardation plate 9 and a polarizer 10 are laminated on the outer face of the glass substrate 6. The transparent electrode 5 and reflective electrode 2 respectively consist of more than one parallel stripe, crossing perpendicularly each other when looking at the substrate 1 in plan view. Each cross section of the stripes of the transparent electrode 5 and reflective electrode 2 becomes one dot. A gap between dots is covered with the light blocking layer 4 to prevent any light leakage.

The liquid crystal layer 7 is configured with a twisted nematic mode having a 45° twist. The retardation plate 9 is configured with a $\lambda/4$ wave plate.

A single pixel includes three dots each of red, green, and blue.

A key point in the present invention is that each parameter is set in a way that the phase difference of the light passing through each dot of red, green, and blue becomes equivalent and matched to each other when the optical wavelength of each dot of red, green, and blue is $\lambda_R$, $\lambda_G$, and $\lambda_B$; the thickness of the liquid crystal layer 7 in each dot of red, green, and blue is respectively $d_R$, $d_G$, and $d_B$; the refractive index anisotropy of the liquid crystal layer in the optical wavelengths of $\lambda_R$, $\lambda_G$, and $\lambda_B$ is respectively $\Delta n_R$, $\Delta n_G$, and $\Delta n_B$; and retardation of the retardation plate is respectively $Re_R$, $Re_G$, and $Re_B$.

When voltage is not applied to the liquid crystal layer, the phase difference when the light passes through the liquid crystal layer once may, for example, be expressed as $2\pi^* \alpha^* \Delta n_R^* d_R/\lambda_R$ for the red dot. Here, $\alpha$ is the twist coefficient dependent on the twisting angle of the liquid crystal layer. When the liquid crystal layer is not twisted, the twist coefficient is 1. In this exemplary embodiment, the twisting angle is 45°, which makes the twist coefficient about 0.69. This coefficient is obtainable by optical simulation based on the Jones matrix method. If the twisting angle is 60°, $\alpha=0.60$. If the twisting angle is 90°, the Gooch-Tarry relation is applicable, making the twist coefficient $\alpha=1/\sqrt{}$, $\sqrt{3}=0.577$.

When the light becomes linearly polarized in the polarizer, passes through the retardation plate and the liquid crystal layer, and then reaches the reflector, the phase difference may, for example, be expressed as $2\pi^*(\alpha^* d_G^* \Delta n_G + Re_G)/\lambda_G$ for the green dot. Accordingly, each parameter is set to satisfy the following relation between the red and green dots in order to match the phase difference at each red, green, and blue dot:

$$(\alpha^* \Delta n_R^* d_R + Re_R)/\lambda_R = (\alpha^* \Delta n_G^* d_G + Re_G)/\lambda_G \quad (1); \text{ and}$$

$$(\alpha^* \Delta n_G^* d_G + Re_G)/\lambda_G = (\alpha^* \Delta n_B^* d_B + Re_B)/\lambda_B \quad (2)$$

for the green and blue dots.

When voltage is applied to the liquid crystal layer, the phase difference shifts from $2\pi^* \alpha^* \Delta n_G^* d_G/\lambda_G$. However, since the degree of shift is almost identical among the red, green, and blue dots, the phase difference among the dots is maintained at almost the same value.

Practically speaking, however, it may not be feasible to manufacture LCDs precisely satisfying Formulae 1 and 2, considering the dispersion among products. The effect of the present invention may still be demonstrated if the phase difference falls within the range shown by the following Formulae 3 and 4:

$$0.9 \leq ((\alpha d_R^* \Delta n_R + Re_R)/\lambda_R)/((\alpha^* d_G^* \Delta n_G + Re_G)/\lambda_G) \leq 1.1 \quad (3)$$

$$0.9 \leq ((\alpha^* d_B^* \Delta n_B + Re_{B)/\lambda B})/((\alpha^* d_G^* \Delta n_G + Re_G)/\lambda_G) \leq 1.1 \quad (4)$$

Next, conditions for displaying white (bright) and black (dark) in the reflective LCD employing a single polarizer are described. For displaying white, the linearly polarized light passing through the polarizer 10 becomes circularly polarized at the retardation plate 9. This light then passes through the liquid crystal layer 7, is reflected on the reflective electrode 2, and then passes through the liquid crystal layer and retardation plate 9 again, returning to the polarizer 10. At the time the light returns to the polarizer 10, the light needs to be in the form of linearly polarized light in the same direction as before. Accordingly, the total phase difference of the light generated by reciprocating between the retardation plate 9 and liquid crystal layer 7 needs to be a multiple of $2\pi$. The phase difference in one way of the light may thus be expressed with a multiple of $\pi$, which is half, i.e. $m\pi$ where m is a natural number. For black display, the light returning to the polarizer 10 needs to be linearly polarized, but perpendicular to the polarizing direction of the incident light. Accordingly, the phase difference in one way needs to be $(m-½)\pi$.

On the other hand, liquid crystal molecules in the liquid crystal layer are aligned almost parallel to the substrate when voltage is not applied, showing optical anisotropy relative to the incident light. The phase difference of the light passing the liquid crystal layer 7 may, for example, be $2\pi^* \alpha^* d_G^* \Delta n_G/\lambda_G$ for the green dot. When sufficient voltage is applied, the liquid crystal molecules are aligned perpendicular to the substrate, showing almost no optical anisotropy relative to the incident light. The phase difference thus becomes close to 0.

Accordingly, when the ¼λ wave plate for changing the phase for $\pi/2$ is employed as the retardation plate 9, the total phase difference in one way while sufficient voltage is applied to the liquid crystal layer 7 becomes only $\pi/2$ of the retardation plate 9, corresponding to the black (dark) display. A high contrast black and white display is thus achievable by displaying white (bright) when voltage is not applied. For this purpose, the total phase difference in one way when voltage is not applied to the liquid crystal layer needs to be $m\pi$. More specifically, white display is possible under the following conditions, for example, for the green dot:

$$2\pi^*(\alpha^* d_G^* \Delta n_G + ¼)/\lambda_G = m\pi \quad (5).$$

The same formula needs to be satisfied for the red and blue dots. Retardation corresponding to each wavelength in case of using the ¼λ wave plate is $Re_R = \lambda_R/4$, $Re_{G=\lambda G}/4$, and $Re_B = \lambda_B/4$.

Based on the above design concept, $d_G$ and $\Delta n_G$ are designed to satisfy Formula 5 for the green dot. A range of phase differences for the red and blue dots is determined in accordance with $d_G$, $\Delta n_G$, and the relation satisfying the above Formulae 3 and 4. Consequently, the phase differences among red, green, and blue dots are kept within a predetermined range.

The effect of the above design is that light with almost equivalent intensity of white (bright) level is achieved among red, green, and blue dots when voltage is not applied to liquid crystal, enabling the reduction of coloring.

When voltage is applied, although the refractive index anisotropy of the liquid crystal layer falls in proportion to the strength of the electric field, the degree of reduction among red, green, and blue dots is almost equivalent, as described above, making the phase difference of the light passing each dot almost identical. Accordingly, the circularly polarized light entering each dot is modulated to almost the same degree at the liquid crystal layer 7, enabling an equivalent intensity of light to be achieved for each dot. Accordingly, coloring in halftones may be reduced. When sufficient voltage is applied, and the refractive index anisotropy of the liquid crystal layer becomes sufficiently small, this is scarcely affected by any change in the phase difference at the liquid crystal layer 7. The phase difference of the exiting light changes only for $\pi$ in both ways by the retardation plate. The reflection light thus reaches the face of the polarizer in the form of linearly polarized light perpendicular to the linearly polarized light of the incident light. As a result, light with almost the same intensity of black (dark) level is achieved for each red, green, and blue dot, realizing achromatic color in the light-blocked state.

This enables the suppression of a shift in phase difference of the light passing each dot, achieving the suppression of coloring in white and halftone display and the suppression of lower contrast in black display caused by a light leakage.

In the first exemplary embodiment, the thickness of the liquid crystal layers $d_R$, $d_G$, and $d_B$ are set to satisfy $d_B < d_G < d_R$ in order to satisfy the relation in Formulae 3 and 4, when the wavelength of peak transmittance of the light passing each dot of blue, green, and red is respectively 450 nm, 550 nm, and 650 nm.

For adjusting the thickness $d_R$, $d_G$, and $d_B$ of the liquid crystal layer, the thickness of the color filter layer is stepped. In other words, the thickness of the color filter layers $T_R$, $T_G$, and $T_B$ for red, green, and blue dots are set to satisfy $T_R < T_G < T_B$.

The above reflective LCD is manufactured as described below. First, the aluminum reflective electrode 2 which has both functions of reflector and electrode is formed on a non-alkali glass substrate 1. The color filter layers 3a, 3b, and 3c made of red, green, and blue pigments are formed on the non-alkali glass substrate 6 opposing the glass substrate 1. The transparent electrode 5 made of indium tin oxide (ITO) is formed on the color filter layers 3a, 3b, and 3c. The thickness $T_R$, $T_G$, and $T_B$ for red, green, and blue color filter layers satisfy $T_R < T_G < T_B$. A polyimide orientation film (e.g. SE-7210 by Nissan Chemical Industries, Ltd.) is respectively formed on the reflective electrode 2 and transparent electrode 5, and rubbed to the twisting angle of 45°. Two substrates are pasted using the sealing material 8 in which glass fibers are mixed (e.g. LC STRUCTBOND by Mitsui Chemicals, Inc.). Next, chiral nematic liquid crystal with a small chromatic dispersion of refractive index anisotropy, allowing $\Delta n_R$, $\Delta n_G$, and $\Delta n_B$ to be regarded as constant, is injected, after which the inlet is sealed with UV-curing resin to form the liquid crystal layer 7. Then, the λ/4 wave plate as the retardation plate 9 is laminated on the outer face of the glass substrate 6 on which the color filter layers 3a, 3b, and 3c are formed. The polarizer 10 is laminated on the λ/4 wave plate to complete the reflective color LCD.

Since Δn of the chiral nematic liquid crystal used is close to $\Delta n_R = \Delta n_G = \Delta n_B = 0.06$, differences in thickness among the color filter layers are created in a way that the thickness of the liquid crystal layer becomes $d_G = 4$ μm, $d_B = 3.4$ μm, and $d_R = 4.5$ μm. In other words, the thickness of color filter layers 3a, 3b, and 3c for each red, green, and blue dot are set to $T_R = 0.9$ μm, $T_G = 1.4$ μm, and $T_B = 2.0$ μm.

In white display, the phase difference of the light passing each red, green, and blue dot is respectively $(0.415*0.69+0.25)*2\pi$, $(0.436*0.69+0.25)*2\pi$ and $(0.453*0.69+0.25)*2\pi$.

Accordingly, the next calculation is achieved:

$$((\alpha^* d_R{}^*\Delta n_R + Re_R)/\lambda_R)/((\alpha^* d_G{}^*\Delta n_G + Re_G)/\lambda_G) = 0.97;\text{ and}$$

$$((\alpha^* d_B{}^*\Delta n_B + Re_B)/\lambda_B)/((\alpha^* d_G{}^*\Delta n_G + Re_G)/\lambda_G) = 1.02.$$

These satisfy the relations in Formulae 1 and 2.

The chromaticity and integral reflectance of the above reflective color liquid crystal display were measured. For measurement, a calorimeter (CM-508D by Minolta Co., Ltd.) was used, and a standard white board was used as a reference. Results indicated the chromaticity of white to be (x, y)=(0.320, 0.320) on the CIE chromaticity coordinates against the C light source, and the reflectance was R=15%. For black display, the chromaticity was (x, y)=(0.28, 0.29), and reflectance was R=0.9%. High contrast display with less coloring is thus achieved.

The first exemplary embodiment describes the case of a passive matrix reflective color LCD. It is apparent that the concept of the present invention is not limited to this type of LCD. The present invention is naturally applicable to an active matrix LCD on which switching elements such as TFTs are formed.

Second Exemplary Embodiment

A reflective LCD in a second exemplary embodiment of the present invention is described below. The reflective LCD of this exemplary embodiment has the same overall configuration as that of the first exemplary embodiment, and thus illustration of the configuration is omitted. Unlike the first exemplary embodiment, however, the liquid crystal layer 7 has a homogeneous orientation. Conditions for white display when the λ/4 wave plate is used as the retardation plate 9 are $(\Delta n_G{}^* d_G)/\lambda_G = m/2\frac{1}{4}$ (m is a natural number) for the green dot, for example, since the twist coefficient is α=1. Here, m is set to m=2. Liquid crystal with refractive index anisotropy of 0.09 is used, and the color filter layer for each dot is stepped to achieve the thickness of $d_G = 4.5$ μm, $d_B = 3.8$ μm, and $d_R = 5.0$ μm for the liquid crystal layer. In other words, the thickness of the color filter layers 3a, 3b, and 3c are formed to satisfy $T_R = 0.5$ μm, $T_G = 1.2$ μm, and $T_B = 1.7$ μm.

With this configuration, the phase difference in each red, green, and blue dot will respectively be $(0.692+0.25)^*2\pi$, $(0.736+0.25)^*2\pi$, and $(0.76+0.25)^*2\pi$, achieving close to a constant level.

As in the first exemplary embodiment, the panel reflectance was measured under a diffused light source. Chromaticity of white on the CIE chromaticity coordinates against the C light source was (x, y)=(0.315, 0.320), and reflectance was R=15%. For black display, the chromaticity was (x, y)=(0.28, 0.29), and reflectance was R=0.9%. Accordingly, the second exemplary embodiment enables the reduction of coloring and prevention of low contrast in white display. The same effect is also achievable with a homeotropic orientation.

Third Exemplary Embodiment

Figure 2:
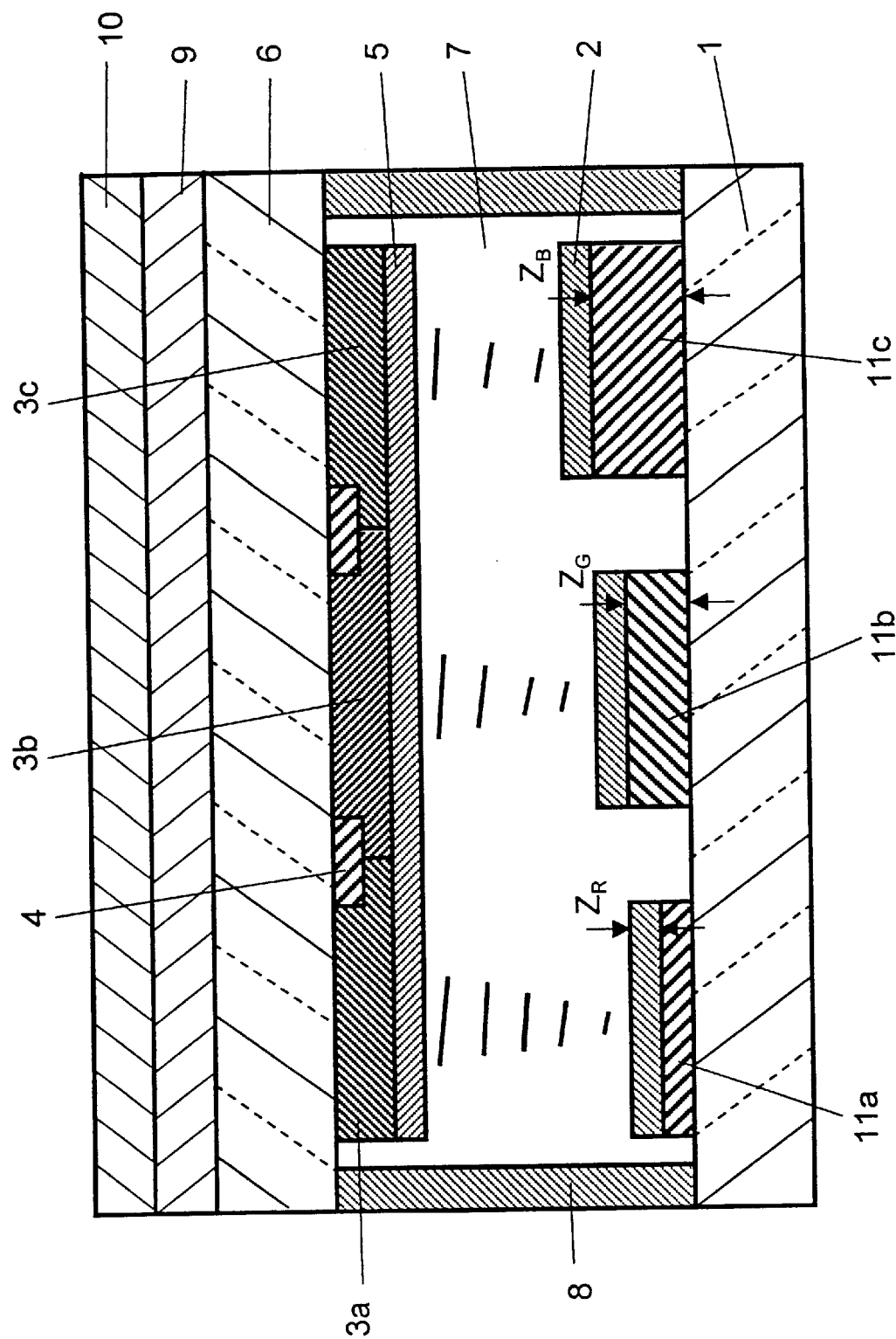
FIG. 2 is a sectional view of a reflective color liquid crystal display device in accordance with a third exemplary embodiment of the present invention.

A configuration of a reflective color LCD in a third exemplary embodiment of the present invention is described below with reference to a sectional view in FIG. 2. The detail which differs from the first exemplary embodiment in this exemplary embodiment is that the glass substrate on which the reflective electrode is deposited is stepped as means for creating differences in thickness of the liquid crystal layer to satisfy $d_B < d_G < d_R$. The reflective electrode is formed on an interlayer insulating film, and the thickness of the interlayer insulating film corresponding to portions of red, green, and blue dots are set to satisfy $Z_R < Z_G < Z_B$ where $Z_R$, $Z_G$, and $Z_B$ are the film thickness of each dot.

More specifically, interlayer insulating films 11a, 11b, and 11c for each dot with different thickness are formed on the glass substrate 1, using acrylic resin. The reflective electrode 2 made of aluminum is then formed. The thickness of the interlayer insulating films 11a, 11b, and 11c are set to $Z_R = 1$ μm, $Z_G = 1.6$ μm, and $Z_B = 2.1$ μm. Next, the red, green, and blue color filter layers 3a, 3b, and 3c made of pigment types of the same thickness are formed on the opposing glass substrate 6, and then the transparent electrode 5 is deposited. A polyimide orientation film is formed on these two glass substrates 1 and 6, and rubbed to achieve 45° TN orientation. The glass substrates 1 and 6 are then pasted with the sealing material 8 to achieve the thickness of 4 μm of the liquid crystal layer at the green dot. Liquid crystal with refractive index anisotropy of 0.06 is injected to form the liquid crystal layer 7. The λ/4 wave plate as the retardation plate 9 and polarizer 10 are then laminated on the outer face of the glass substrate 6 to complete the reflective color LCD.

As in the first exemplary embodiment, the panel reflectance was measured under a diffused light source. The chromaticity of white on the CIE chromaticity coordinates against the C light source was (x, y)=(0.3 15, 0.320), and reflectance was R=15%. For black display, the chromaticity was (x, y)=(0.28, 0.29), and reflectance was R=0.9%. Accordingly, the third exemplary embodiment enables the reduction of coloring and prevention of low contrast in white display. The same effect is also achievable with both homogeneous orientation and homeotropic orientation.

The third exemplary embodiment can also be sufficiently employed for an active matrix LCD on which switching element such as a TFT element is formed.

Fourth Exemplary Embodiment

Figure 3:
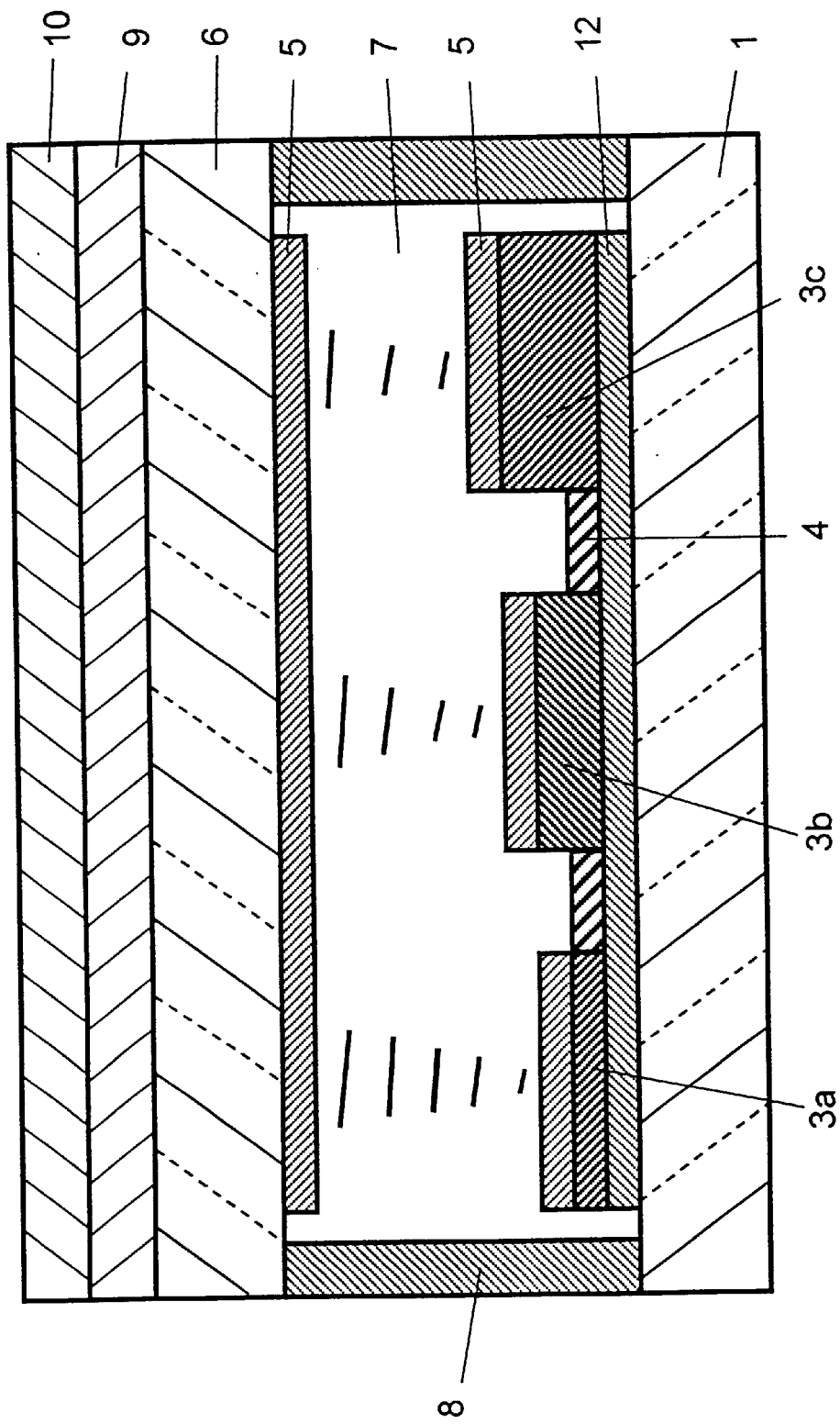
FIG. 3 is a sectional view of a reflective color liquid crystal display device in accordance with a fourth exemplary embodiment of the present invention.

A configuration of a reflective color LCD in a fourth exemplary embodiment of the present invention is described below with reference to a sectional view in FIG. 3. The detail which differs from the first exemplary embodiment in this exemplary embodiment is that the color filter layer is formed on the reflective layer as means for creating differences in thickness of the liquid crystal layer to satisfy $d_B < d_G < d_R$. More specifically, the red, green, and blue color filter layers are formed on the reflective layer, and a transparent electrode made of ITO is formed on the color filter layers. The red, green, and blue color filter layers are set to satisfy $T_R < T_G < T_B$ where $T_R$, $T_G$, and $T_B$ are the film thickness of each color filter layer.

Next, a method for manufacturing the above color LCD is detailed. The reflective layer 12 made of aluminum is deposited on the glass substrate 1, and the stepped color filter layers 3a, 3b, and 3c for each red, green, and blue dot are formed on the reflective layer 12 using pigment dispersion resist. Then, the transparent electrode 5 is deposited. The thickness of the color filter layers 3a, 3b, and 3c are set to $T_R = 1$ μm, $T_G = 1.6$ μm, and $T_B = 2.1$ μm. The transparent electrode 5 made of ITO is then deposited on the opposing glass substrate 6. Polyimide orientation film is formed on these two glass substrates 1 and 6, and they are rubbed to achieve 45° TN orientation. The glass substrates 1 and 6 are then pasted by the sealing material 8 in a way to achieve the thickness of 4 μm of the liquid crystal layer at the green dot. Liquid crystal with refractive index anisotropy of 0.06 is injected to form the liquid crystal layer 7. The λ/4 wave plate as the retardation plate 9 and polarizer 10 are laminated on an outer face of the glass substrate 6 to complete the reflective color LCD.

As in the first exemplary embodiment, the panel reflectance was measured under a diffused light source. The chromaticity of white on the CIE chromaticity coordinates against the C light source was (x, y)=(0.315, 0.320), and reflectance was R=15%. For black display, the chromaticity was (x, y)=(0.28, 0.29), and reflectance was R=0.9%. Accordingly, the third exemplary embodiment enables the reduction of coloring and prevention of low contrast in white display. The same effect is also achievable with both homogeneous orientation and homeotropic orientation.

In the fourth exemplary embodiment, the reflective layer is covered with the color filter layer. This protects the surface of Al configuring the reflective layer, and thus reduces scratches in the rubbing process and prevents corrosion of Al by entering of moisture in a long-term use.

Fifth Exemplary Embodiment

Figure 4:
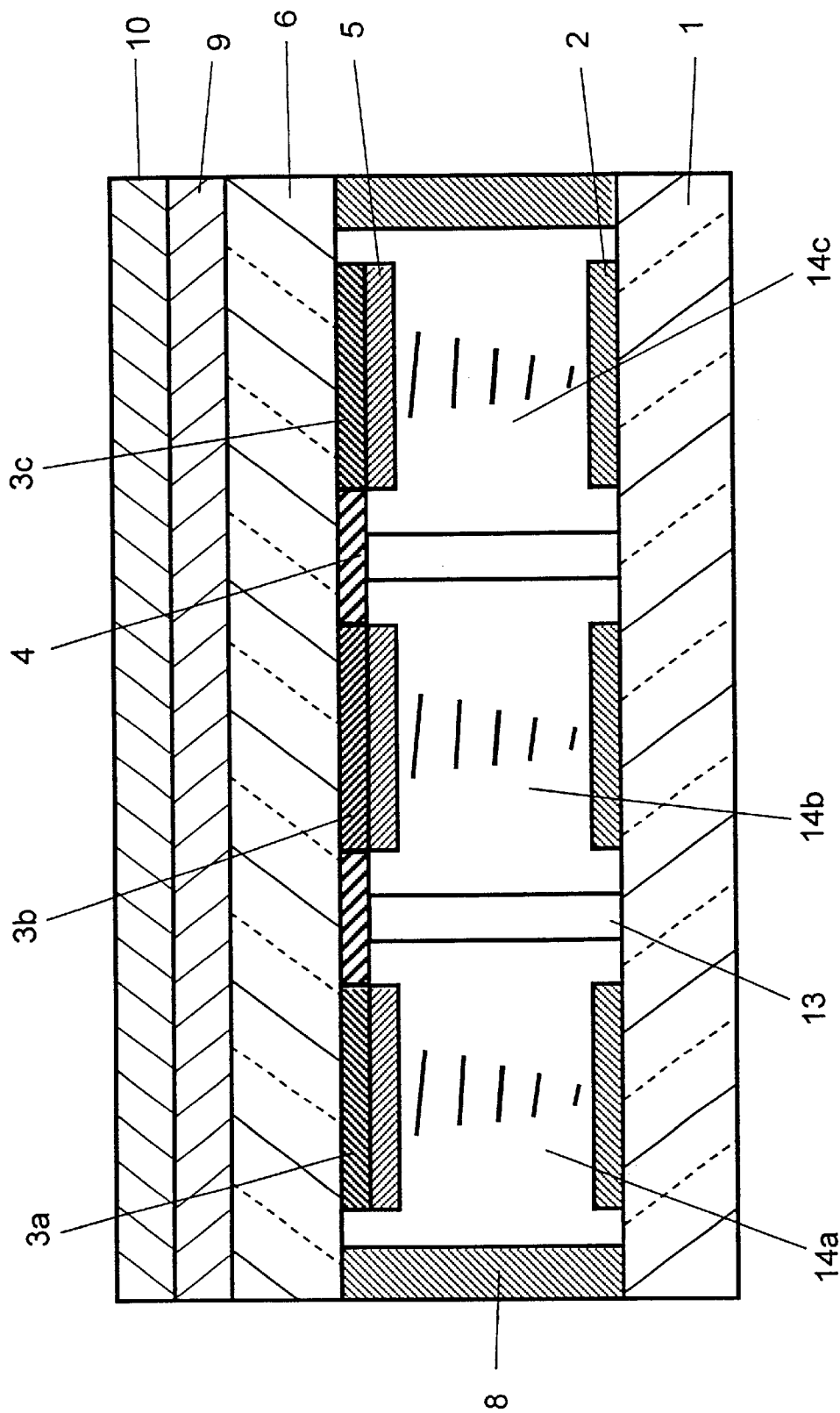
FIG. 4 is a sectional view of a reflective color liquid crystal display device in accordance with a fifth exemplary embodiment of the present invention.

A configuration of a reflective color LCD in a fifth exemplary embodiment of the present invention is described below with reference to FIG. 4. The detail which differs from the first exemplary embodiment in this exemplary embodiment is that a wall is provided for each red, green, and blue dot, and that liquid crystal with different refractive index anisotropy is used for each dot. The liquid crystal layers for red, green, and blue satisfy $\Delta n_B < \Delta n_G < \Delta n_R$, where each refractive index anisotropy is $\Delta n_R$, $\Delta n_G$, and $\Delta n_B$.

The manufacturing method is detailed next. After depositing the reflective electrode 2 made of aluminum on the glass substrate 1, the red, green, and blue color filter layers 3a, 3b, and 3c of the pigment type are formed on the opposing glass substrate 6. Then, the transparent electrode 5 is deposited. A wall 13 of 3 $\mu$m height is formed in stripes between dots, using photo sensitive acrylic resist (e.g. PC302 by JSR Corporation). The polyimide orientation film is formed on these two glass substrates 1 and 6, and then they are rubbed to achieve 45° TN orientation. The glass substrates 1 and 6 are pasted with the sealing material 8. Next, liquid crystal with refractive index anisotropy of $\Delta n=0.09$ for the red dot, liquid crystal with $\Delta n=0.08$ for the green dot, and liquid crystal with $\Delta n=0.065$ for the blue dot are injected to form the liquid crystal layers 14a, 14b, and 14c. The $\lambda/4$ wave plate as the retardation plate 9 and polarizer 10 are laminated on the outer face of the glass substrate 6 to complete the reflective color LCD.

The phase difference in white display for each red, green, and blue dot in the reflective color LCD in this exemplary embodiment is $(0.287+0.25)*2\pi$, $(0.301+0.25)*2\pi$, and $(0.299+0.25)*2\pi$, since $\alpha=0.69$. Almost the constant phase difference is thus achieved.

Also in this exemplary embodiment, coloring in white and halftone displays and lower contrast are reduced, same as in other exemplary embodiments.

The fifth exemplary embodiment describes the case of TN orientation for the liquid crystal layer. The same effect is also achievable with homogenous orientation, homeotropic orientation, and hybrid orientation.

Sixth Exemplary Embodiment

Figure 5:
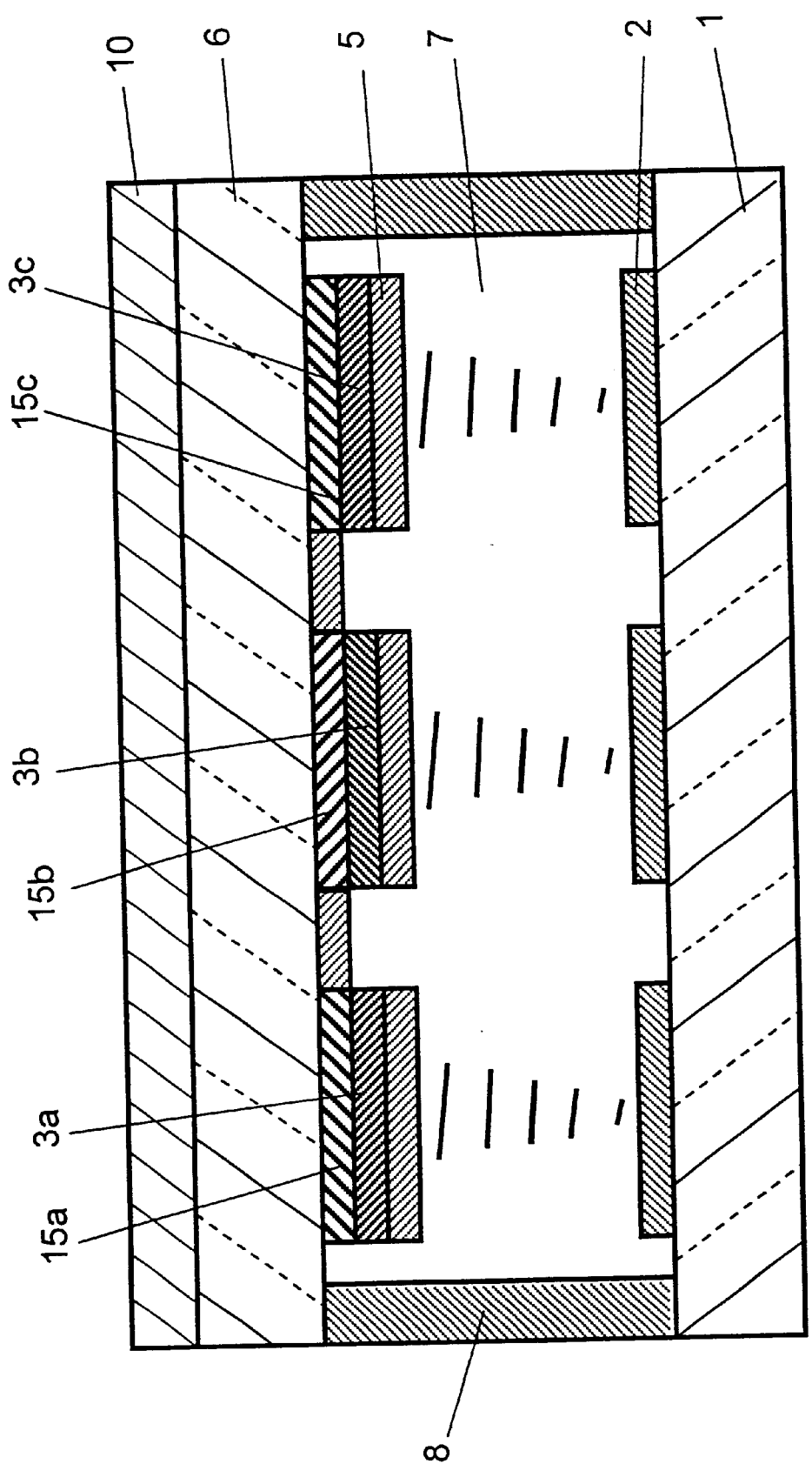
FIG. 5 is a sectional view of a reflective color liquid crystal display device in accordance with a sixth exemplary embodiment of the present invention.

A configuration of a reflective color LCD in a sixth exemplary embodiment is described below with reference to a sectional view in FIG. 5. The detail which differs from the first exemplary embodiment in this exemplary embodiment is that a retardation layer instead of retardation plate is formed in a liquid crystal cell. In addition, retardation of this retardation layer is changed for each color. When retardations of the retardation layer for each red, green, and blue are expressed by $Re_R$, $Re_G$, and $Re_B$; thickness of the liquid crystal layer are $d_R$, $d_G$, and $d_B$; wavelengths of visible light passing each dot are $\lambda_R$, $\lambda_G$, and $\lambda_B$; and refractive index anisotropy of the liquid crystal layer in the visible light wavelengths of $\lambda_R$, $\lambda_G$, and $\lambda_B$ is $\Delta n_R$, $\Delta n_G$, and $\Delta n_B$; these parameters are set to satisfy aforementioned Formulae 3 and 4.

A manufacturing method is detailed next. The reflective electrode 2 made of aluminum is deposited on the glass substrate 1, and retardation layers 15a, 15b, and 15c made of liquid crystal polymer are formed at positions corresponding to red, green, and blue dots on the opposing glass substrate 6. Retardation of each of the retardation layers 15a, 15b, and 15c are respectively set around $Re_R=170\pm5$ nm, $Re_G=140\pm5$ nm, and $Re_B=95\pm5$ nm. Next, the red, green, and blue color filter layers 3a, 3b, and 3c of the pigment dispersion type are formed. The transparent electrode 5 is deposited on the color filter layers 3a, 3b, and 3c. The polyimide orientation film is formed on the two glass substrates 1 and 6, and then they are rubbed to achieve 45° TN orientation. The glass substrates 1 and 6 are pasted with the sealing material 8. Liquid crystal is injected, and sealed to complete the liquid crystal layer 7. The polarizer 10 is laminated on the outer face of the glass substrate 6. Here, the thickness of the liquid crystal layer at the red, green, and blue dots are made equal, which is 4 $\mu$m. As for liquid crystal, a material with almost the same wavelength dispersion characteristics in refractive index anisotropy, i.e., $\Delta n_R=\Delta n_{G7}=\Delta n_B=0.06$, is employed.

In the reflective color LCD of this exemplary embodiment, the phase difference for white display in each red, green, and blue dot is $(0.516\pm0.008)*2\pi$, $(0.556\pm0.009)*2\pi$, and $(0.579\pm0.011)*2\pi$ where $\alpha=0.69$.

Accordingly, the relation between the green and red dots is $0.90<((\alpha d_R*\Delta n_R+Re_R)/\lambda_R)/((\alpha*d_G*\Delta n_G+Re_G)/\lambda_G)<0.96$, satisfying Formula 3. The relation between green and blue dots is $1.01<((\alpha*d_B*\Delta n_B+Re_B)/\lambda_B)/((\alpha*d_G*\Delta n_G+Re_G)/\lambda_G)<1.08$, satisfying Formula 4. Such configuration enables the suppression of deviation in phase differences among red, green, and blue dots, and thus reduces coloring in white display and prevents low contrast.

The sixth exemplary embodiment describes the case of TN orientation. The same effect is also achievable with homogenous orientation and homeotropic orientation.

Seventh Exemplary Embodiment

Figure 6:
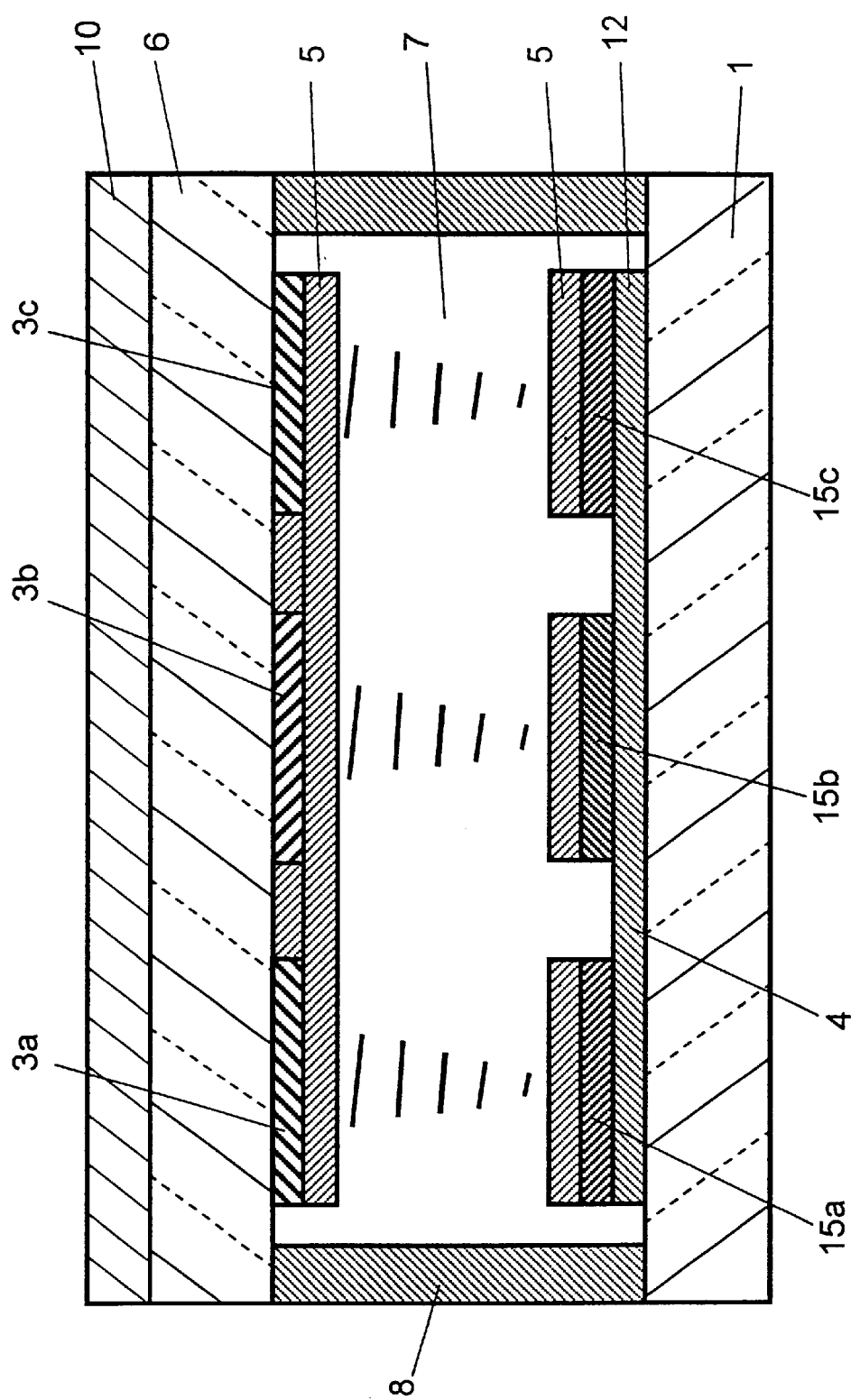
FIG. 6 is a sectional view of a reflective color liquid crystal display device in accordance with a seventh exemplary embodiment of the present invention.

A configuration of a reflective color LCD in a seventh exemplary embodiment is described below with reference to a sectional view in FIG. 6. The details which differ from the first exemplary embodiment in this exemplary embodiment are that the retardation layer, instead of the retardation plate, is formed on the reflective layer in the liquid crystal cell, and the liquid crystal layer has a homogenous orientation.

A manufacturing method is detailed next. The reflective layer 12 made of aluminum is deposited on the glass substrate 1, and the retardation layers 15a, 15b, and 15c made of liquid crystal polymer are formed at positions corresponding to the red, green and blue dots. The transparent electrode 5 made of ITO is formed on the retardation layers 15a, 15b, and 15c. Retardations of each of the retardation layers 15a, 15b, and 15c are set around $Re_R=200\pm5$ nm, $Re_G=140\pm5$ nm, and $Re_B=70\pm5$ nm. The red, green, and blue color filters 3a, 3b, and 3c of the pigment type are formed on the opposing glass substrate 6, and then the transparent electrode 5 made of ITO is deposited. The polyimide orientation film is formed on the two glass substrates 1 and 6, and they are rubbed to achieve homogenous orientation. The glass substrates 1 and 6 are pasted with the sealing material 8. Liquid crystal is injected, and sealed to form the liquid crystal layer 7. Then, the polarizer 10 is laminated on an outer face of the glass substrate 6. The thickness of the red, green, and blue liquid crystal layers are set constant, i.e., 4.5 μm. As for the liquid crystal material, a material with almost constant wavelength dispersion characteristics in the refractive index anisotropy, i.e., Δn=0.09, is employed.

The phase difference in the white display at each red, green, and blue dot in the reflective color LCD of this exemplary embodiment is respectively $(0.931\pm0.008)*2\pi$, $(0.991\pm0.009)*2\pi$, and $(1.056\pm0.011)*2\pi$. The relation between green and red dots is $0.923 < ((d_R*\Delta N_R + Re_R)/\lambda_R) / ((d_G*\Delta N_G + Re_G)/\lambda_G) < 0.956$, satisfying Formula 3. The relation between green and blue dots is $1.044 < ((d_B*\Delta n_B + Re_B)/\lambda_B) / ((d_G*\Delta n_G + Re_G)/\lambda_G) < 1.086$, satisfying Formula 4. Since homogenous orientation is employed in the seventh exemplary embodiment, α=1. The above configuration thus enables to make the phase difference among red, green, and blue dots same, reducing coloring in white display and preventing low contrast.

It is apparent that the same effect is also achievable with TN orientation and homeotropic orientation.

Eighth Exemplary Embodiment

Figure 7:
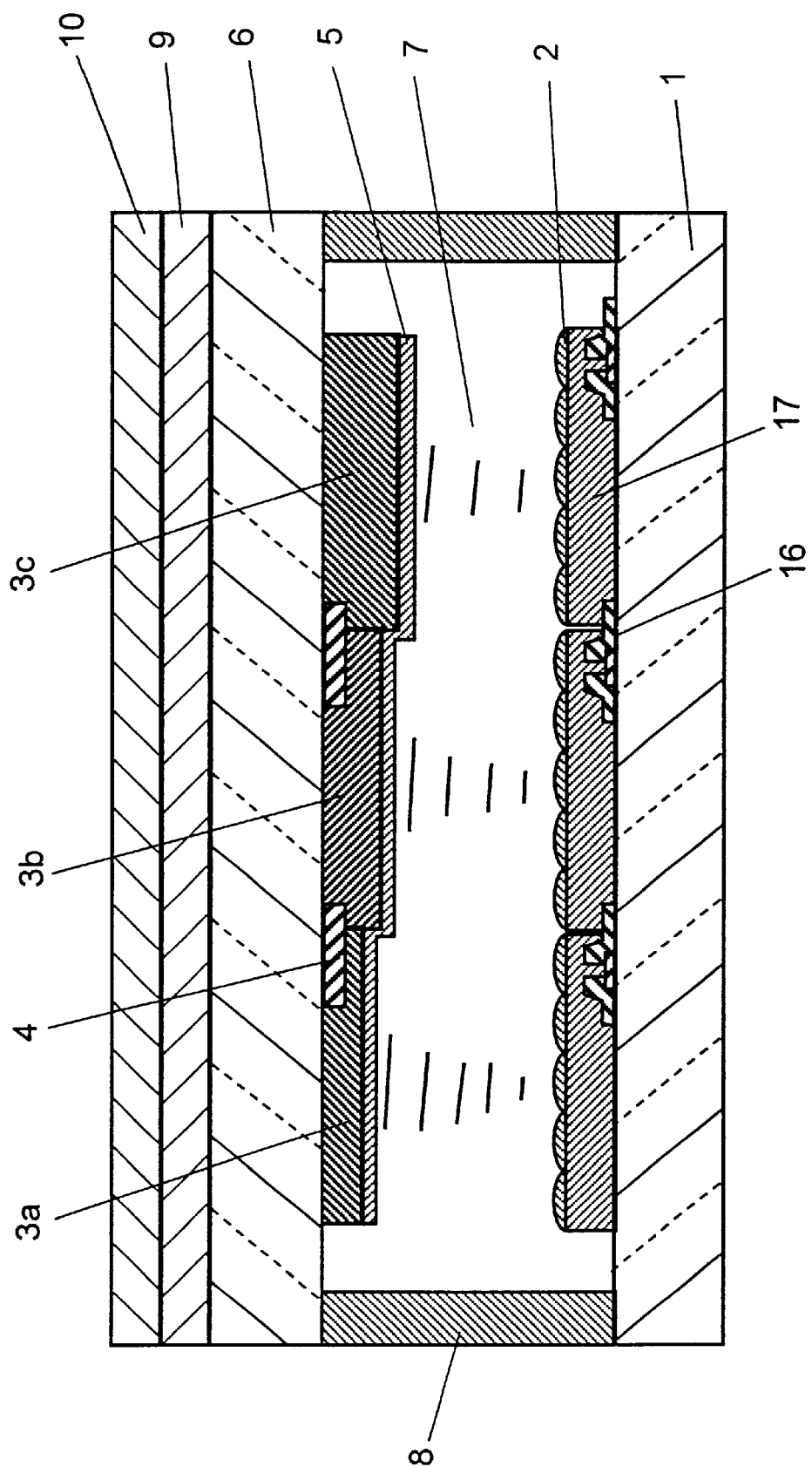
FIG. 7 is a sectional view of a reflective color liquid crystal display device in accordance with an eighth exemplary embodiment of the present invention.
Figure 8:
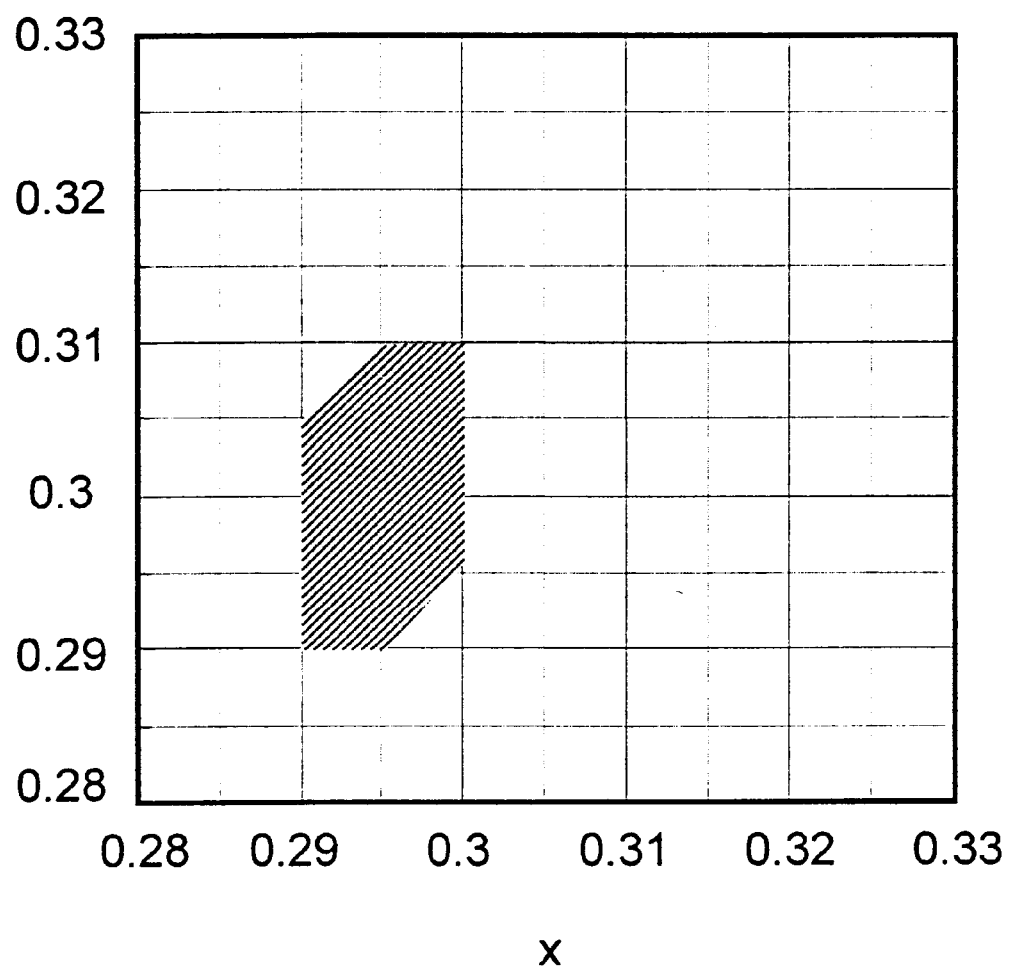
FIG. 8 is a chromaticity diagram in the XYZ colorimetric system for white display under a condition of using C light source for the incident light entering a reflective color liquid crystal display device in accordance with an eighth exemplary embodiment of the present invention.
Figure 9:
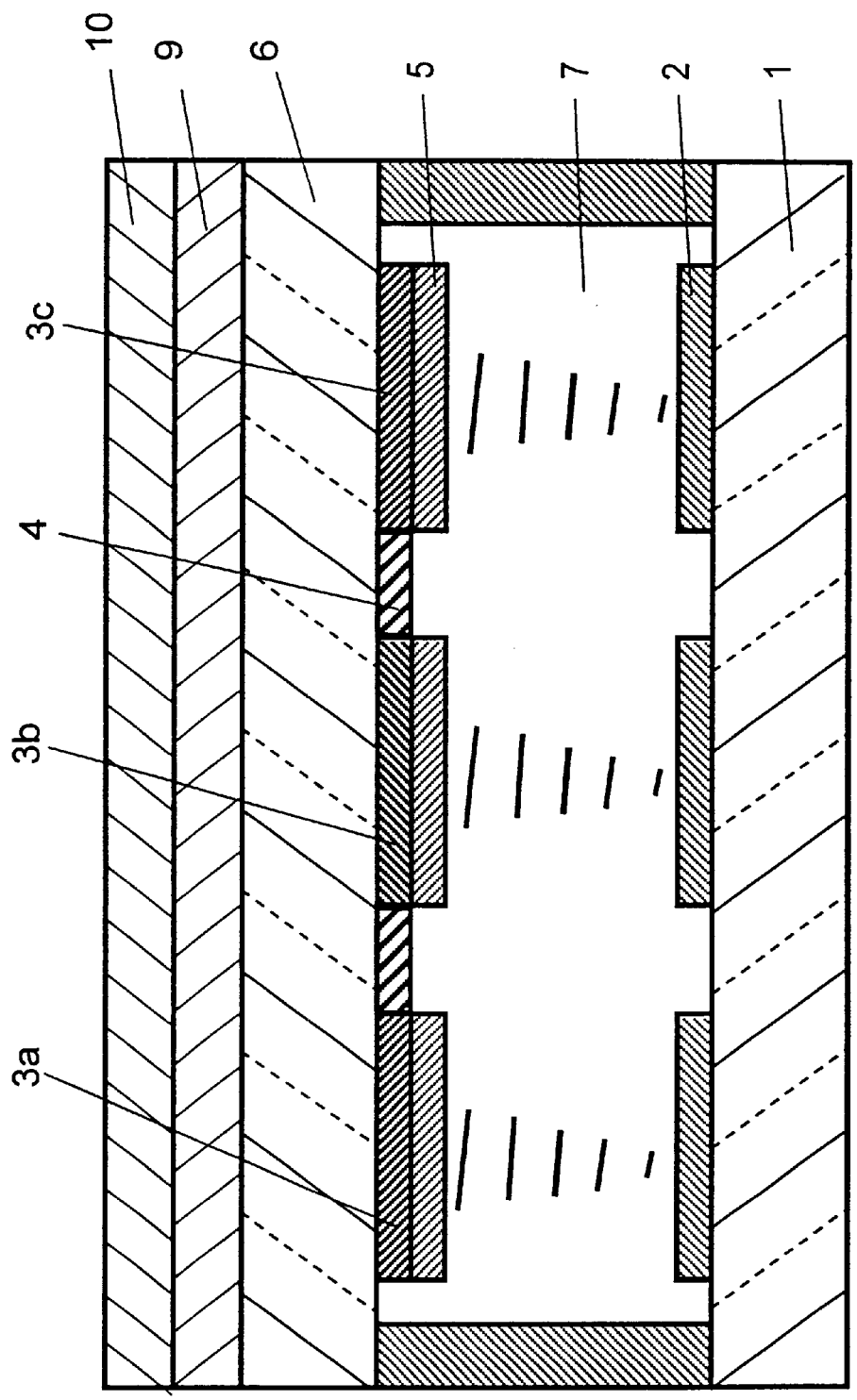
FIG. 9 is a sectional view of a conventional reflective color liquid crystal display device.

A configuration of a reflective color liquid crystal display device in an eighth exemplary embodiment is described below with reference to FIG. 7. This exemplary embodiment employs a reflective LCD of the active matrix type in which the reflective electrode 2 is deposited on the glass substrate 1 after a TFT element 16 is formed through an interlayer insulating film 17. As in the first exemplary embodiment, the λ/4 wave plate is employed as the retardation plate, and the liquid crystal layer has a 45° twist. Parameters including retardation of the retardation plate, and refractive index anisotropy and thickness of the liquid crystal layer satisfy Formulae 3 and 4. The details which differ from the first exemplary embodiment in this exemplary embodiment are that the color filter with the following characteristics is employed. When the C light source is used as the incident light, and chromaticity coordinates of a chromaticity diagram in the XYZ calorimetric system for white obtained by an additive process of the light passing the red, green, and blue color filter layers are (x, y), conditions expressed by $0.290 \leq x \leq 0.300$, $0.290 \leq y \leq 0.310$, and $|x-y| \leq 0.015$ as illustrated in the shaded area of FIG. 8, are satisfied. In addition, the transmittance in the above white (Y) level is between 55 and 65.

More specifically, when the C light source is used as the incident light, the next formula is satisfied for red:

$0.390 \leq xr \leq 0.410$ and $0.290 \leq yr \leq 0.310$;

whereas (xr, yr), (xg, yg), and (xb, yb) are chromaticity coordinates of the chromaticity diagram in the XYZ calorimetric system for the light passing the red, green, and blue color filter layers, and Yr, Yg, and Yb are the Y level. In addition, the Y level satisfies $50 \leq Yr \leq 60$.

In the same way, for green, the next formula and $80 \leq Yg \leq 90$ for the Y level are satisfied:

$0.310 \leq xg \leq 0.330$ and $0.380 \leq yg \leq 0.400$.

In the same way, for blue, the next formula and $30 \leq Yg \leq 40$ for the Y level are satisfied:

$0.150 \leq xb \leq 0.170$ and $0.200 \leq yb \leq 0.220$.

The color filter in this exemplary embodiment is set to x=0.400, y=0.300, and Y=53 for red, x=0.320, y=0.390, and Y=85 for green, and x=0.165, y=0.210, and Y=34 for blue. The thickness of each color filter is set to $T_R$=1.2 μm for red, $T_G$=1.5 μm for green, and $T_B$=1.8 μm for blue. The phase difference in each color is set to satisfy Formulae 3 and 4. The chromaticity of white made by additive process of the light passing the color filter layer is x=0.300, y=0.309, and Y=57.

The chromaticity and integral reflectance of the reflective color LCD in this exemplary embodiment were measured using the colorimeter (CM-508D by Minolta Co., Ltd.), and the standard white board is used as reference. The C light source is used as a light source. In case of the eighth exemplary embodiment, chromaticity of white and reflectance was (x, y)=(0.30, 0.31) and R=15% on CIE chromaticity coordinates against the C light source. In black display, (x, y)=(0.30, 0.30) and R=0.9%. High achromatic color and high contrast display are thus achieved. Further high achromatic color in black and white displays are achievable when the chromaticity coordinates (x, y) in white state of the color filter layers are set to $0.290 \leq x \leq 0.300$, $0.290 \leq y \leq 0.310$, and $|x-y| \leq 0.015$. On the other hand, if values exceed the above range, the color filter causes color shifting. For example, red coloring occurs in x>y+0.015, green coloring occurs in y>x+0.015, yellow coloring in x>0.300 and y>0.310, and blue coloring in x<0.290 and y<0.290.

For the Y level, reflectance is low in white display when Y<55, and the color purity lowers in Y>65 contrarily. Accordingly, $55 \leq Y \leq 65$ is an appropriate range for satisfying both good reflectance and color reproducibility.

The eighth exemplary embodiment describes the configuration of forming the color filter layer on the opposing glass substrate. The same effect is also achievable by providing the color filter layer on the reflective layer as shown in FIG. 3.

As described above, deviation in phase differences of the light passing each of the red, green, and blue dots may be reduced by changing the thickness of the liquid crystal layer, refractive index anisotropy of the liquid crystal layer, or retardation of the retardation plate for red, green, and blue in order to achieve a constant value for $(\alpha*d_R*\Delta n_R+Re_R)/\lambda_R$, $(\alpha*d_G*\Delta n_G+Re_G)/\lambda_G$, and $(\alpha*d_B*\Delta n_B+Re_B)/\lambda_B$;

where $d_R$, $d_G$, and $d_B$: Thickness of the liquid crystal layers in each red, green, and blue dot configuring a pixel;

$\lambda_R$, $\lambda_G$, and $\lambda_B$: Wavelength of visible light transmitting each dot;

$\Delta n_R$, $\Delta n_B$, and $\Delta n_G$: Refractive index anisotropy of the liquid crystal layer;

$Re_R$, $Re_G$, and $Re_B$: Retardation of the retardation plate; and

α: Twisting coefficient.

Accordingly, a reflective color LCD with less loss of contrast and less coloring during white and halftone displays is achievable.

Reference Numerals 1 glass substrate
2 reflective electrode
3a red color filter layer
3b green color filter layer
3c blue color filter layer
5 transparent electrode
6 opposing glass substrate
7 liquid crystal layer
8 sealing material
9 retardation plate
10 polarizer
11a interlayer insulating film for red dot
11b interlayer insulating film for green dot
11c interlayer insulating film for blue dot
12 reflective layer
13 wall
14a liquid crystal layer for red dot
14b liquid crystal layer for green dot
14c liquid crystal layer for blue dot
15a retardation layer for red dot
15b retardation layer for green dot
15c retardation layer for blue dot

What is claimed is:

1. A reflective color liquid crystal display device comprising at least one pixel, each pixel comprising a red dot, a green dot, and a blue dot, each dot comprising:

a first substrate having an inner face;

a second substrate having an inner face facing said first substrate inner face, and an outer face;

a liquid crystal layer interposed between said first and second substrates;

a reflective layer formed on the inner face of said first substrate;

a color filter layer interposed between said reflective layer and said second substrate;

a polarizer disposed over the outer face of said second substrate; and a retardation element disposed over the outer face of said second substrate or interposed between said reflective layer and said second substrate;

wherein said reflective color liquid crystal display device satisfies:

$$0.9 \leq ((\alpha^* dR^* \Delta nR + ReR)/\lambda R)/((\alpha^* dG \times \Delta nG + ReG)/\lambda G) \leq 1.1 \quad \text{(Formula 3)};$$

$$0.9 \leq ((\alpha^* dB^* \Delta nB + ReB)/\lambda B)/((\alpha^* dG \times \Delta nG + ReG)/\lambda G) \leq 1.1 \quad \text{(Formula 4); and}$$

where, dR, dG, and dB=thicknesses of the liquid crystal layer for each of said red dot, green dot, and blue dot, respectively;

$\lambda R$, $\lambda G$, and $\lambda B$=wavelengths of visible light passing through each of said red dot, green dot, and blue dot, respectively;

$\Delta nR$, $\Delta nG$, and $\Delta nB$=refractive index anisotropies of the liquid crystal layer for each of said red dot, green dot, and blue dot, respectively, when said wavelengths of visible light are $\lambda R$, $\lambda G$, and $\lambda B$, respectively;

ReR, ReG, and ReB=retardations of said retardation element when said wavelengths of visible light are $\lambda R$, $\lambda G$, and $\lambda B$, respectively; and $\alpha$=a twist coefficient dependent on a molecular liquid crystal twisting angle.

2. The reflective color liquid crystal display device of claim 1 wherein the liquid crystal layer thicknesses $d_R$, $d_G$, and $d_B$ are unequal to one another.

3. The reflective color liquid crystal display device of claim 2 wherein the color filter layer for each dot has a thickness, each dot having a first sum equal to the liquid crystal layer thickness plus the color filter layer thickness, in which the first sums corresponding to each dot are equal to one another.

4. The reflective liquid crystal display device of claim 2 further comprising an interlayer insulating film for each dot on one of said first and second substrates, said interlayer insulating film having a thickness for each dot, wherein each dot has a second sum equal to said interlayer insulating film thickness plus said liquid crystal layer thickness, in which the second sums corresponding to each dot are equal to one another.

5. The reflective color liquid crystal display device of claim 1 wherein said color filter is disposed on the reflective layer.

6. The reflective color liquid crystal display device of claim 3 wherein said color filter is disposed on the reflective layer.

7. The reflective color liquid crystal display of claim 1 wherein $\Delta n_R$, $\Delta n_G$, and $\Delta n_B$ are unequal to one another.

8. The reflective color liquid crystal display device of claim 7 wherein said liquid crystal layer comprises an orientation selected from the group consisting of: TN, homogeneous, and homeotropic.

9. The reflective color liquid crystal display device of claim 1 wherein said retardation element comprises a retardation plate disposed on the outer face of said second substrate.

10. The reflective color liquid crystal display device of claim 1 wherein said retardation element comprises a retardation layer disposed on said reflective layer.

11. The reflective color liquid crystal display device of claim 1 wherein said retardation element comprises a retardation layer disposed on the inner face of said second substrate.

12. The reflective color liquid crystal display device of claim 1 wherein said liquid crystal layer comprises an orientation selected from the group consisting of: TN, homogeneous, and homeotropic.

13. The reflective color liquid crystal display device of claim 1 wherein the device has a chromaticity coordinate (x, y) for a white state of a chromaticity diagram in an XYZ calorimetric system obtained by an additive process of a light from a C light source passing through the color filter layers for the red dot, the green dot, and the blue dot, where $0.290 \leq x \leq 0.300$, $0.290 \leq y \leq 0.310$, and $|x-y| \leq 0.015$, and in which the device has a luminance (Y) level in a white state between 55 and 65.

14. The reflective color liquid crystal display device of claim 13 wherein:

$$0.390 \leq xr \leq 0.410, \ 0.290 \leq yr \leq 0.310, \text{ and } 50 \leq Yr \leq 60;$$

$$0.310 \leq xg \leq 0.330, \ 0.380 \leq yg \leq 0.400, \text{ and } 80 \leq Yg \leq 90; \text{ and}$$

$$0.150 \leq xb \leq 0.170, \ 0.200 \leq yb \leq 0.220, \text{ and } 30 \leq Yb \leq 40;$$

where:

(xr, yr), (xg, yg), and (xb, yb) are the chromaticity coordinates (x, y) for the light passing through the color filter layer for the red dot, green dot, and blue dot, respectively, and Yr, Yg, and Yb are the Y level for the red dot, green dot, and blue dot, respectively.

15. The reflective color liquid crystal display device of claim 1 wherein the device comprises an active matrix array.

16. The reflective color liquid crystal display device of claim 13 wherein the device comprises an active matrix array.

* * * * *

UNITED STATES PATENT AND TRADEMARK OFFICE
CERTIFICATE OF CORRECTION

PATENT NO. : 6,661,484 B1
DATED : December 9, 2003
INVENTOR(S) : Iwai et al.

It is certified that error appears in the above-identified patent and that said Letters Patent is hereby corrected as shown below:

<u>Title page,</u>
Item [54], Title, should read -- IMPROVED RETARDATION MATCHING USING THE LIQUID CRYSTAL TWIST ANGLE FOR DIFFERENT COLOR DOTS WITHIN A PIXEL OF A REFLECTIVE COLOR LCD --

<u>Column 13,</u>
Line 50, insert -- $\alpha \neq 1$ --;

<u>Column 14,</u>
Line 50, delete "calorimetric" and insert -- colorimetric --

Signed and Sealed this

Eighteenth Day of May, 2004

JON W. DUDAS
*Acting Director of the United States Patent and Trademark Office*